United States Patent [19]

Greenwood

[11] 4,069,134

[45] Jan. 17, 1978

[54] HYDROGEN-PRODUCING HYDROCARBON CONVERSION WITH GRAVITY-FLOWING CATALYST PARTICLES

[75] Inventor: Arthur R. Greenwood, Niles, Ill.

[73] Assignee: UOP Inc., Des Plaines, Ill.

[21] Appl. No.: 735,706

[22] Filed: Oct. 26, 1976

[51] Int. Cl.$^2$ ............................................ C10G 35/04
[52] U.S. Cl. .................................... 208/64; 208/165; 208/169
[58] Field of Search .................... 208/64, 65, 165, 169

[56] References Cited

U.S. PATENT DOCUMENTS

| 2,285,727 | 6/1942 | Komarewsky | 208/64 |
|---|---|---|---|
| 2,643,214 | 6/1953 | Hartwig | 208/65 |
| 3,843,740 | 10/1974 | Mitchell et al. | 208/64 |
| 3,992,465 | 11/1976 | Juguin et al. | 208/65 |

Primary Examiner—Herbert Levine
Attorney, Agent, or Firm—James R. Hoatson, Jr.; Robert W. Erickson; William H. Page, II

[57] ABSTRACT

A multiple-stage catalytic conversion system in which a hydrocarbonaceous charge stock is reacted in a plurality of catalytic reaction zones, through all of which the catalyst particles flow downwardly via gravity-flow. The charge stock, in the absence of added, or recycle hydrogen, is reacted in a first reaction zone (1) into which fresh, or regenerated catalyst particles are introduced and, (2) from which deactivated catalyst particles are withdrawn for regeneration. The reaction product effluent emanating from the first reaction zone is further reacted in a multiple-zone stacked reaction system (1) into the uppermost zone of which fresh, or regenerated catalyst particles are introduced and (2) from the lowermost zone of which deactivated catalyst particles are withdrawn for regeneration. The product effluent from the lowermost reaction zone in the stacked system is separated to recover the intended product.

8 Claims, 1 Drawing Figure

U.S. Patent
Jan. 17, 1978
4,069,134
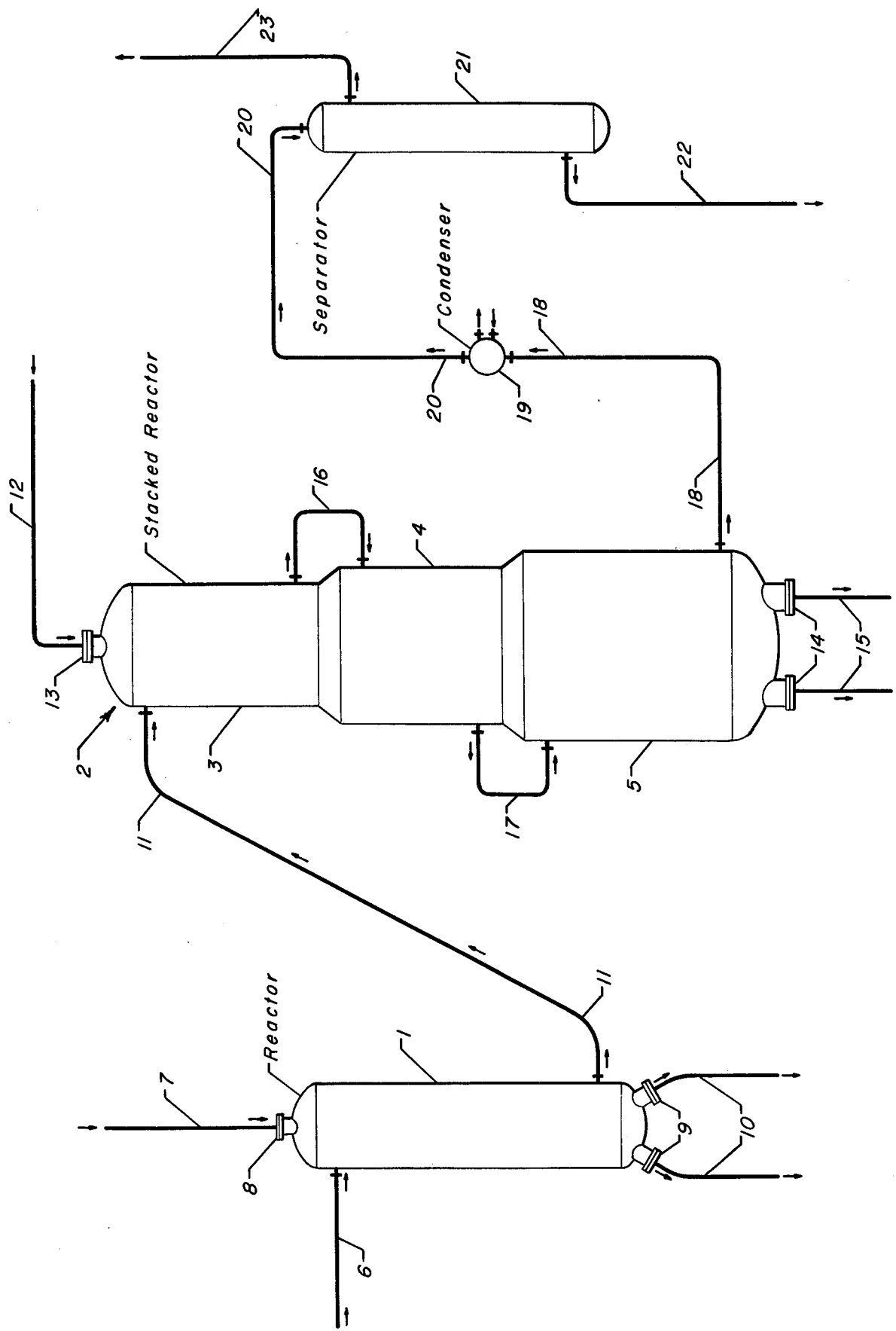

HYDROGEN-PRODUCING HYDROCARBON CONVERSION WITH GRAVITY-FLOWING CATALYST PARTICLES

APPLICABILITY OF INVENTION

The present invention is directed toward an improved technique for effecting the catalytic conversion of a hydrocarbonaceous reactant stream in a multiple-stage reaction system wherein (1) the reactant stream flows serially through the plurality of reaction zones and, (2) the catalyst particles are movable through each reaction zone via gravity-flow. More particularly, the described process technique is adaptable for utilization in vapor-phase systems where (1) the conversion reactions are principally hydrogen-producing, or endothermic, (2) where fresh, or regenerated catalyst particles are introduced into at least two reaction zones and, (3) deactivated catalyst particles are withdrawn from at least two reaction zones for subsequent regeneration.

Various types of multiple-stage reaction systems have found widespread utilization throughout the petroleum and petrochemical industries for effecting multitudinous reactions, especially hydrocarbon conversion reactions. Such reactions are either exothermic, or endothermic, and both hydrogen-producing and hydrogen-consuming. Multiple-stage reaction systems are generally of two types: (1) side-by-side configuration with intermediate heating between the reaction zones, wherein the reactant stream or mixture flows serially from one zone to another zone; and, (2) a stacked design wherein a single reaction chamber, or more, contains the multiple catalytic contact stages. Such systems, as applied to petroleum refining, have been employed to effect numerous hydrocarbon conversion reactions including those which are prevalent in catalytic reforming, alkylation, ethylbenzene dehydrogenation to produce styrene, other dehydrogenation processes, etc. My invention is specifically intended for utilization in endothermic, or hydrogen-producing hydrocarbon conversion processes, in the reaction zones of which the catalyst particles are downwardly movable via gravity-flow. Thus, it is contemplated that the technique encompassed by my inventive concept is adaptable where (1) a first reaction zone exists in side-by-side relationship with a stacked system containing two or more reaction zones and, (2) where at least three reaction zones exist in side-by-side relationship with each other. In the first configuration, the charge stock passes serially from the single reaction zone through the stacked reaction zones. Fresh, or regenerated catalyst particles are introduced into the top of the single reaction zone and into the uppermost reaction zone in the stacked system, and deactivated catalyst particles, intended for regeneration, are withdrawn from the bottom of the single reaction zone and from the lowermost reaction zone in the stacked system. My invention is also intended to be applied to those reaction systems wherein the catalyst is disposed as an annular bed and the flow of the reactant stream, serially from one zone to another reaction zone, is perpendicular, or radial to the movement of catalyst particles. In the interest of brevity, the following discussion will be directed toward those systems wherein a downwardly moving bed of catalyst particles is employed in the conversion of a hydrocarbonaceous reactant stream, with the catalyst particles being disposed in the form of an annular bed, through which the reactant stream flows laterally and radially.

A radial-flow reaction system generally consists of tubular-form sections, of varying nominal cross-sectional areas, vertically and coaxially disposed to form the reaction vessel. Briefly, the system comprises a reaction chamber containing a coaxially disposed catalyst-retaining screen, having a nominal, internal cross-sectional area less than said chamber, and a perforated centerpipe having a nominal, internal cross-sectional area less than the catalyst-retaining screen. The reactant stream is introduced in vapor-phase, into the annular-form space created between the inside wall of the chamber and the outside surface of the catalyst-retaining screen. The latter forms an annular-form, catalyst-holding zone with the outside surface of the perforated centerpipe; vaporous reactant flows laterally and radially through the screen and catalyst zone into the centerpipe and out of the reaction chamber. Although the tubular-form configuration of the various reactor components may take any suitable shape — i.e., triangular, square, oblong, diamond, etc. — many design, fabrication and technical considerations indicate the advantages of using components which are substantially circular in cross-section.

Illustrative of a multiple-stage stacked reactor system, to which the present invention is particularly adaptable, is that shown in U.S. Pat. No. 3,706,536 (Cl. 23-288G), issued Dec. 19, 1972. As indicated, the transfer of the gravity-flowing catalyst particles from one reaction zone to another, as well as introduction of fresh catalyst particles and withdrawal of "spent" catalyst particles, is effected through the utilization of a plurality of catalyst-transfer conduits. Briefly, my inventive concept encompasses a process wherein the fresh feed charge stock, without added, or recycle hydrogen, initially contacts gravity-flowing catalyst particles in a first separate reactor whose small inventory of catalyst can be turned over very rapidly at a rate independent of that in the stacked reactors. The primary advantage stems from the elimination of the compressor otherwise required to recycle the hydrogen-rich vaporous phase to combine with the fresh feed charge stock prior to the first reaction zone. Another major benefit, as hereinafter set forth, resides in the concomitant reduction in the size of the catalyst regeneration facilities.

OBJECTS AND EMBODIMENTS

A principal object of my invention is to eliminate compressive recycle of hydrogen in a multiple-stage, hydrogen-producing hydrocarbon conversion process. A corollary objective is to afford significant utilities savings, energy, in hydrocarbon conversion processes wherein large quantities of hydrogen are normally circulated.

A specific object of the present invention is directed toward an improvement in the catalytic reforming of hydrocarbons in a multiple-stage reaction zone system through which catalyst particles are movable via gravity-flow. Another object is directed toward a reduction in the size of the regeneration facilities integrated into the multiple-stage reaction system, which facilities also function with gravity-flowing catalyst particles.

In one embodiment, the present invention is directed toward a multiple-stage process for catalytically reforming a hydrocarbon charge stock which comprises the steps of: (a) at least periodically introducing fresh, or regenerated catalyst particles into the upper end of a first reaction zone, through which catalyst particles are movable via gravity-flow, at least periodically withdrawing deactivated catalyst particles from the lower end of said first reaction zone and reacting said charge stock, in the absence of added hydrogen, in said first zone at catalytic reforming conditions; (b) at least periodically introducing fresh, or regenerated catalyst particles into the upper end of a stacked reactor system containing a plurality of reaction zones having a common vertical axis and through which catalyst particles are movable via gravity-flow, at least periodically withdrawing deactivated catalyst particles from the lower end of said system and introducing the reaction product effluent from said first reaction zone into the uppermost reaction zone in said stacked reactor system, and at catalytic reforming conditions; (c) further reacting the resulting uppermost reaction product effluent, at catalytic reforming conditions, in a lower reaction zone in said stacked reactor system; and, (d) recovering a normally liquid, catalytically-reformed product from the effluent withdrawn from the lowest reaction zone in said stacked reactor system.

In a more specific embodiment, my invention encompasses a multiple-stage process for catalytically reforming a hydrocarbon charge stock which comprises the steps of: (a) at least periodically introducing fresh, or regenerated catalyst particles into the upper end of a first reaction zone through which catalyst particles are movable via gravity-flow, at least periodically withdrawing deactivated catalyst particles from the lower end of said first reaction zone and reacting said charge stock, without added hydrogen, in said first zone at catalytic reforming conditions; (b) at least periodically introducing fresh, or regenerated catalyst particles into the upper end of a second reaction zone being the uppermost zone of a stacked system containing three reaction zones, said system having a common vertical axis and through which catalyst particles are movable via gravity-flow from one reaction zone to the next succeeding reaction zone, and further reacting the resulting first reaction zone effluent in said second reaction zone at catalytic reforming conditions; (c) at least periodically transferring catalyst particles from the lower end of said second reaction zone, via gravity-flow, into the upper end of a third reaction zone being the middle zone of said stacked system, and further reacting the resulting second reaction zone effluent in said third reaction zone at catalytic reforming conditions; (d) at least periodically transferring catalyst particles from the lower end of said third reaction zone, via gravity-flow, into the upper end of a fourth reaction zone being the lowermost zone of said system, and further reacting the resulting third reaction zone effluent in said fourth reaction zone at catalytic reforming conditions; and, (e) at least periodically withdrawing deactivated catalyst particles from the lower end of said fourth reaction zone and recovering a normally liquid, catalytically-reformed product from the resulting fourth reaction zone effluent.

These, as well as other objects and embodiments will become evident from the following, more detailed description of the present hydrocarbon conversion process. In one such other embodiment, the first reaction zone contains the least amount of catalyst particles, preferably from about 5.0 to about 15.0% by volume of the total catalyst in the multiple-stage system. Thus, where the stacked system consists of three additional reaction zones, the uppermost zone contains 15.0 to about 25.0%, the middle zone about 25.0 to about 35.0% and the lowermost zone about 35.0 to about 50.0%.

PRIOR ART

Candor compels recognition of the fact that various types of hydrocarbon conversion processes utilize multiple-stage reaction systems, either in side-by-side configuration, as a vertically-disposed stack, or a combination of a stacked system in side-by-side relation with one or more separate reaction zones. As applied to petroleum refining, such systems may be employed in a wide variety of hydrocarbon conversion reactions. While my inventive concept is adaptable to many conversion reactions and processes, through the reaction system of which the catalyst particles are movable via gravity-flow, the same will be additionally described in conjunction with the well-known endothermic, or hydrogen-producing catalytic reforming process. Historically, the catalytic reforming process has been effected in a non-regenerative, fixed-bed system comprising a plurality of reaction zones in side-by-side relation. When the catalytic composite had become deactivated to the extent that continuous operation was no longer economically feasible, the entire unit was shut-down and the catalyst regenerated in situ. Of more recent vintage is the so-called "swing bed" system in which an extra reactor is substituted for one which is due to be placed off-stream for regeneration purposes. Still more recently, multiple-stage reactor systems have been provided in which the catalyst particles flow, via gravity, through each reaction zone. In a "stacked" system, the catalyst particles also flow downwardly from one catalyst-containing zone to another, and ultimately transfer to a suitable regeneration system also preferably functioning with a downwardly moving bed of catalyst particles. In effect, the catalyst particles are maintained from one section to another in a manner such that the flow of catalyst is continuous, at frequent intervals, or at extended intervals, with the movement being controlled by the quantity of catalyst withdrawn from the last of the series of individual reaction zones.

U.S. Pat. No. 3,470,090 (Cl. 208-138) issued Sept. 30, 1969 illustrates a multiple-stage, side-by-side reaction system with intermediate heating of the reactant stream which flows serially through the individual reaction zones. Catalyst withdrawn from any one of the reaction zones is transported to suitable regeneration facilities. A system of this type can be modified to the extent that the catalyst particles withdrawn from a given reaction zone are transported to the next succeeding reaction zone, while that catalyst withdrawn from the last reaction zone may be transported to a suitable regeneration facility. The necessary modifications can be made in the manner disclosed in U.S. Pat. No. 3,839,197 (Cl. 208-174), issued Oct. 1, 1974, involving an inter-reactor catalyst transport method. Catalyst transfer from the last reaction zone in the plurality to the top of the catalyst regeneration zone is possible through the technique illustrated in U.S. Pat. No. 3,839,196 (Cl. 208-174), issued Oct. 1, 1974.

A stacked reaction configuration is shown in U.S. Pat. No. 3,647,680 (Cl. 208-65), issued Mar. 7, 1972, as a two-stage system having an integrated regeneration facility which receives that catalyst withdrawn from the bottom reaction zone. Similar stacked configurations are illustrated in U.S. Pat. No. 3,692,496 (Cl. 23-288 G), issued Sept. 19, 1972 and U.S. Pat. No. 3,725,249 (Cl. 208-139), issued Apr. 3, 1973.

As hereinbefore stated, general details of a three reaction zone, stacked system are present in U.S. Pat. No. 3,706,536 (Cl. 23-288 G), issued Dec. 19, 1972, and illustrates one type of multiple-stage system to which the present inventive concept is applicable. It should be noted, as generally practiced in a catalytic reforming unit, that each succeeding reaction zone contains a greater volume of catalyst. U.S. Pat. No. 3,864,240 (Cl. 208-64), issued Feb. 4, 1975, is illustrative of the integration of a reaction system having gravity-flowing catalyst particles with a fixed-bed system. As stated in this reference, one of the advantages resides in revamping an existing three reaction zone, fixed-bed system to conform to the integrated system. In such a modification, it is suggested that a second compressor be added to permit the split-flow of hydrogen-rich recycle gas as also described in U.S. Pat. No. 3,516,924 (Cl. 208-75), issued June 23, 1970.

U.S. Pat. No. 3,725,248 (Cl. 208-138), issued Apr. 3, 1973 illustrates a multiple-stage system in side-by-side configuration with gravity-flowing catalyst particles being transported from the bottom of one reaction zone to the top of the next succeeding reaction zone, those catalyst particles being removed from the last reaction zone being transferred to suitable regeneration facilities. As illustrated, the flow of the fresh feed charge stock is countercurrent to the flow of catalyst particles from one zone to the top of the next succeeding reaction zone. Thus, the fresh feed initially contacts those catalyst particles which have experienced the greatest degree of deactivation. However, there is no recognition of the "no recycle hydrogen" concept forming the foundation of the present invention. As stated, conventional reforming entails admixing a considerable excess of hydrogen with the hydrocarbon charge stock — e.g. up to about a mole ratio of hydrogen/hydrocarbon of 10.0:1.0.

These illustrations are believed to be fairly representative of the art which has developed in the multiple-stage conversion systems wherein catalyst particles are movable through each reaction zone via gravity-flow. It is noteworthy that there is no recognition of the present inventive concept of no recycle hydrogen to the first reaction zone, into which the fresh feed charge stock is initially introduced. Furthermore, the reaction system configuration of the present invention is not disclosed.

SUMMARY OF INVENTION

As hereinbefore set forth, the process encompassed by my inventive concept is suitable for use in hydrocarbon conversion systems characterized as multiple-stage and in which catalytic particles are movable, via gravity-flow, in each reaction zone. Furthermore, the present invention is principally intended for utilization in systems where the principal reactions are endothermic, or hydrogen-producing, and are effected in vapor-phase operation. Although the following discussion is specifically directed toward catalytic reforming of naphtha boiling range fractions, there is no intent to so limit the present invention. Catalytic reforming, as well as many other processes, has experienced several phases of development currently terminating in a system in which the catalyst beds assume the form of a descending column in one or more reaction vessels. Typically, the catalysts are utilized in spherical form having a nominal diameter ranging from about 1/32-inch to about 5/32-inch in order to offer free-flow characteristics which will neither bridge, nor block the descending column, or columns of catalyst within the overall system. In one such multiple-stage system, the reaction chambers are vertically stacked, and a plurality (generally from 6 to 16) of relatively small diameter conduits are employed to transfer catalyst particles from one reaction zone to the next lower reaction zone (via gravity-flow) and ultimately as withdrawn catalyst from the last reaction zone. The latter are usually transported to the top of a catalyst regeneration facility, also functioning with a descending column of catalyst particles; regenerated catalyst particles are transported to the top of the upper reaction zone of the stack. In order to facilitate and enhance gravity-flow within each reaction vessel, as well as from one to another, it is particularly important that the catalyst particles have a relatively small nominal diameter, and one which is preferably less than about 5/32-inch. In a conversion system having the individual reaction zones in side-by-side relationship, catalyst transport vessels (of the type shown in U.S. Pat. No. 3,839,197) are employed in transferring the catalyst particles from the bottom of one zone to the top of the succeeding zone, and from the last reaction zone to the top of the regeneration facility (U.S. Pat. No. 3,839,196).

Catalytic reforming of naphtha boiling range hydrocarbons, a vapor-phase operation, is effected at conversion conditions which include catalyst bed temperatures in the range of about 700° to about 1020° F.; judicious and cautious techniques generally dictate that catalyst temperatures not substantially exceed a level of about 1020° F. Other conditions include a pressure from about 50 psig. to about 1000 psig., a liquid hourly space velocity (defined as volumes of fresh charge stock per hour, per volume of total catalyst particles) of from 0.2 to about 10.0 and, prior to the present invention, a hydrogen to hydrocarbon mole ratio from about 1.0:1.0 to about 10.0:1.0, with respect to the initial reaction zone. As those possessing the requisite skill in the refining art are aware, the described continuous regenerative reforming system offers numerous advantages when compared to the prior fixed-bed systems. Among these is the capability of efficient operation at lower pressures — e.g. 50 psig. to about 150 psig. — and higher liquid hourly space velocities — e.g. 3.0:1.0 to about 8.0:1.0. Further, as a result of continuous catalyst regeneration, higher consistent inlet catalyst bed temperatures can be maintained — e.g. 950° to about 1010° F. There also exists a corresponding increase in both hydrogen production and hydrogen purity in the vaporous phase recovered from the product separator.

Catalytic reforming reactions are multifarious, and include the dehydrogenation of naphthenes to aromatics, the dehydrocyclization of paraffins to aromatics, the hydrocracking of long-chain paraffins into lower-boiling normally-liquid material and, to a certain extent, the isomerization of paraffins. These reactions are effected through the use of one or more Group VIII noble metals (e.g. platinum, iridium, rhodium), combined with a halogen (e.g. chlorine and/or fluorine) and a porous carrier material such as alumina. Recent investigations have indicated that more advantageous results are attainable and enjoyed through the cojoint use of a catalytic modifier; these are generally selected from the group of cobalt, nickel, gallium, germanium, tin, rhenium, vanadium and mixtures thereof. Regardless of the particular selected catalytic composite, the ability to attain the advantages over the common fixed-bed systems is greatly dependent upon achieving substantially uniform catalyst flow downwardly through the system.

Catalytic reforming, as currently conventionally practiced, is a well known process which has been thoroughly described in the literature, having been a commercially important tool of the petroleum refining industry for more than a quarter of a century. One of the many items gleaned from the vast amount of reforming experience and resulting knowledge is the soundness of utilizing multiple stages, each of which contains a different quantity of catalyst, expressed generally as volume percent. The reactant stream, hydrogen and the hydrocarbon feed, flows serially through the reaction zones in order of increasing catalyst volume with, of course, interstage heating. In a three reaction zone system, typical catalyst loadings are: first, 10.0 to about 30.0%, second, from 20.0 to about 40.0%; and, third, from about 40.0 to about 60.0%. With respect to a four reaction zone system, suitable catalyst loading would be: first, 5.0 to about 15.0%; second, 15.0 to about 25.0%; third, 25.0 to about 35.0%; and, fourth, 35.0 to about 50.0%. Unequal catalyst distribution, increasing in the serial direction of reactant stream flow, facilitates and enhances the distribution of the reactions and the overall heat of reaction. Current operating techniques involve separating the total effluent from the last reaction zone, in a so-called high-pressure separator, at a temperature of about 60° to about 140° F., to provide the normally liquid product stream and a hydrogen-rich vaporous phase. A portion of the latter is combined with the fresh charge stock as recycle hydrogen, while the remainder is vented from the process.

I have found that the current improved catalytic composites coupled with (1) a reaction zone system in which catalyst particles are movable via gravity-flow and, (2) continuous catalyst regeneration make it possible to effect catalytic reforming without a hydrogen-rich recycle gas stream. This permits a significant reduction in the capital expenditure of a commercial unit by completely eliminating the recycle gas compressor. When there is no recycled hydrogen, the hydrogen/hydrocarbon mole ratio is obviously "zero" at the inlet of the catalyst bed in the first reaction zone which the charge stock "sees". In catalytic reforming, most of the naphthenes are converted to aromatics in this initial reactor; this produces a large amount of hydrogen. In fact, as much as 50.0% of the overall hydrogen production from the entire catalytic reforming process stems from the reactions effected in the first reactor. This hydrogen yield provides an increasing hydrogen/hydrocarbon ratio in the second reactor and subsequent reactors. This means that only reactor number one functions at zero hydrogen/hydrocarbon ratio, and only at the inlet thereto. Therefore, the formation of coke will be higher in this reactor than in any of the subsequent reactors. As hereinbefore stated, considering a four-reactor system, the reactant flow is serially 1-2-3-4; in a stacked system, the number one reaction zone is considered to be at the top. Also, catalyst distribution is generally unequal and such that the catalyst volume increases from one reactor to the next succeeding reactor; that is, the number one zone contains the least amount of catalyst particles, while the last, or fourth reaction zone contains more catalyst than any of the others.

The generally accepted and most common method of operating a gravity-flowing catalytic reforming system, with integral continuous catalyst regeneration, is to stack the reaction zones such that catalyst particles also flow from one reaction zone into the next succeeding lower reaction zone. With this type of arrangement, catalyst circulation rate is the same through all the reactors constituting the stack. Where no recycle gas compressor is provided, this becomes a relatively poor arrangement since the first (uppermost) reaction zone requires a higher catalyst circulation rate due to its high coke deposition. This reactor would then dictate the catalyst circulation rate for all the reactors in the stack. Furthermore, there is the additional disadvantage of highly coked, deactivated catalyst flowing into the second and subsequent reactors where maximum activity is required to effect paraffin isomerization, paraffin dehydrocyclization and hydrocracking.

My invention, as directed to a multiple-stage system wherein catalyst particles flow downwardly via gravity through each reaction zone, and from one zone into the next succeeding zone, is to move the number one (uppermost) reactor out of the stacked system, disposing it as a separate reactor in side-by-side relationship with the stack. Fresh, or regenerated catalyst is periodically introduced into the single side reactor and the uppermost reaction zone in the stack; this can be accomplished by splitting regenerated catalyst into two separately controlled streams. Deactivated catalyst is withdrawn both from the single reactor and the bottom of the lowermost reactor in the stack. Withdrawal of the two catalyst streams can then be consistent with the required circulation rates, or coke deposition, for the side reactor and the stack. Another advantage resides in the fact that the regeneration facility can be made much smaller since its size is dependent upon overall catalyst circulation rate. The coke content of the catalyst withdrawn from the first reactor (single, side reactor) can be permitted to go as high as 20.0%, by weight, rather than the usual 2.0% to a maximum of about 5.0%. This becomes possible in view of the fact that the principal function of the first reaction zone is the dehydrogenation of naphthenes to aromatics.

BRIEF DESCRIPTION OF DRAWING

The further description of the present invention, and the method of operation, will be made in conjunction with the accompanying drawing. It is understood that the drawing is presented solely for the purposes of illustration, and the same is not intended to be construed as limiting upon the scope and spirit of my invention as defined by the appended claims. Therefore, miscellaneous appurtenances, not required for a complete understanding of the inventive concept, have been eliminated, or reduced in number. Such items are well within the purview of one possessing the requisite skill in the appropriate art. The illustrated embodiment is presented as a simplified schematic flow diagram showing a four reaction zone process in which reactor 1 exists in side-by-side relationship with three reactors, 3, 4 and 5, disposed in a vertical stack 2. The charge heater which increases the fresh feed temperature in line 6, and the inter-heaters normally in lines 11, 16 and 17, have not been illustrated. The use of such heaters is well-known and, thus, they form no essential feature of the present invention.

DETAILED DESCRIPTION OF DRAWING

With respect to the volumetric distribution of catalyst particles, the single side reaction zone 1 contains about 10.0%, uppermost reaction zone 3, of stacked reactor 2, contains 15.0%, middle reaction zone 4 about 25.0% and lowermost reaction zone 5 about 50.0%. Fresh, or regenerated catalyst particles are at least periodically introduced into reaction zone 1 through conduit 7 and inlet port 8. The catalyst circulation rate through zone 1 is primarily determined by the quantity of coke deposited thereon; in accordance with the present processing technique, catalyst particles, withdrawn by way of a plurality of outlet ports 9 and conduits 10, can be permitted a coke deposition of about 20.0% by weight. Likewise, fresh, or regenerated catalyst particles are at least periodically introduced into stacked reactor system by way of conduit 12 and inlet port 13. These flow downwardly, via gravity, through reaction zone 3 and therefrom into reaction zone 4. Catalyst particles also flow downwardly via gravity through reaction zone 4, into and through reaction zone 5, and are withdrawn from stacked system 2 through a plurality of outlet ports 14 and conduits 15. These deactivated catalyst particles, and those withdrawn from reaction zone 1, are transported to suitable regeneration facilities, not illustrated. As above stated, the fact that the coke level of the catalyst withdrawn from reaction zone 1 can be as high as 20.0% by weight, results in a lower overall catalyst regeneration rate. The circulation rate through zone 4 is different from that through the stacked system containing zones 3, 4 and 5. Similarly, the rate of fresh, or regenerated catalyst addition via conduits 7 and 12 will not be the same.

The catalyst particles withdrawn from reaction zone 1 will contain up to about 20.0% by weight of coke deposits. However, sufficient activity remains to effect substantial conversion of naphthenes to aromatics and hydrogen. Therefore, the naphtha boiling range charge stock, without recycle hydrogen, after suitable heat-exchange with a higher temperature stream and additional heating to raise its temperature to the level desired at the inlet to the catalyst bed, is introduced via line 6 into reaction zone 1. Approximately 85.0 to about 90.0% of the naphthenes are dehydrogenated to aromatics, with the concomitant production of hydrogen.

Since the dehydrogenation reactions effected in reaction zone 1 are principally endothermic, the temperature of the effluent therefrom in line 11 will be increased through the use of a reaction zone inter-heater. Heated effluent is then introduced into uppermost reaction zone 3, into which regenerated, or fresh catalyst particles are introduced via conduit 12 and inlet port 13. Effluent from reaction 3 is introduced, via line 16, into another reaction zone inter-heater wherein the temperature is once again increased; heated effluent is then introduced thereby into reaction zone 4. The temperature of the effluent from reaction zone 4 is passed via conduit 17 into an inter-heater, and therefrom into reaction zone 5. Product effluent is withdrawn from reaction zone 5 through line 18 and, following its use as a heat-exchange medium, introduced thereby into condenser 19 wherein the temperature is further decreased to a level in the range of about 60° to 140° F. The condensed material is transferred into separator 21 by way of line 20, wherein separation into a normally liquid phase, line 22, and a hydrogen-rich vaporous phase, line 23, is effected.

Through the implementation of the present invention, as above described, the catalytic reforming of a hydrocarbon charge stock is effected in a multiple-stage system, in which catalyst particles flow downwardly, via gravity, through each reaction zone in the system, without the recycling of a portion of the hydrogen-rich vaporous phase separated from the desired normally liquid product effluent. As will be recognized by those skilled in the art, there is afforded a significant capital savings as a result of eliminating the recycle gas compressor, in addition to a concomitant savings in operational utility requirements.

I claim as my invention:

1. A multiple-stage process for catalytically reforming a hydrocarbon charge stock which comprises the steps of:
   a. at least periodically introducing a first quantity of fresh, or regenerated catalyst particles into the upper end of a first moving bed reaction zone, through which catalyst particles are movable via gravity-flow, at least periodically withdrawing deactivated catalyst particles from the lower end of said first moving bed reaction zone and removing the same from said process, reacting said charge stock, in the absence of added hydrogen, in said first zone at catalytic reforming conditions;
   b. at least periodically introducing a second quantity of fresh, or regenerated catalyst particles into the upper end of a stacked moving bed reactor system containing a plurality of moving bed reaction zones having a common vertical axis and through which catalyst particles are movable via gravity-flow, at least periodically withdrawing deactivated catalyst particles from the lower end of said moving bed system and introducing the reaction product effluent from said first moving bed reaction zone into the uppermost reaction zone in said stacked moving bed reactor system, and at catalytic reforming conditions;
   c. further reacting the resulting uppermost reaction product effluent, at catalytic reforming conditions, in a lower moving bed reaction zone in said stacked moving bed reactor system; and,
   d. recovering a normally liquid, catalytically-reformed product from the effluent withdrawn from the lowest reaction zone in said stacked moving bed reactor system.

2. The process of claim 1 further characterized in that said stacked moving bed reactor system contains at least two moving bed reaction zones.

3. The process of claim 1 further characterized in that said stacked moving bed reactor system contains three moving bed reaction zones.

4. The process of claim 1 further characterized in that said first moving bed reaction zone contains the least amount of catalyst particles.

5. The process of claim 4 further characterized in that said first moving bed reaction zone contains from about 5.0 to about 15.0% by volume of the total catalyst in said multiple-stage process.

6. A multiple-stage process for catalytically reforming a hydrocarbon charge stock which comprises the steps of:
   a. at least periodically introducing a first quantity of fresh, or regenerated catalyst particles into the upper end of a first moving bed reaction zone through which catalyst particles are movable via gravity-flow, at least periodically withdrawing deactivated catalysts particles from the lower end of said first moving bed reaction zone and removing the same from said process, reacting said charge stock, without added hydrogen, in said first zone at catalytic reforming conditions;
   b. at least periodically introducing a second quantity of fresh, or regenerated catalyst particles into the upper end of a second moving bed reaction zone being the uppermost zone of a stacked system containing three moving bed reaction zones, said system having a common vertical axis and through which catalyst particles are movable via gravity-flow from one moving bed reaction zone to the next succeeding moving bed reaction zone, and further reacting the resulting first moving bed reaction zone effluent in said second moving bed reaction zone at catalytic reforming conditions;

c. at least periodically transferring catalyst particles from the lower end of said second moving bed reaction zone, via gravity-flow, into the upper end of a third moving bed reaction zone being the middle zone of said stacked system, and further reacting the resulting second moving bed reaction zone effluent in said third moving bed reaction zone at catalytic reforming conditions;

d. at least periodically transferring catalyst particles from the lower end of said third moving bed reaction zone, via gravity-flow, into the upper end of a fourth moving bed reaction zone being the lowermost zone of said system, and further reacting the resulting third moving bed reaction zone effluent in said fourth moving bed reaction zone at catalytic reforming conditions; and, e. at least periodically withdrawing deactivated catalyst particles from the lower end of said fourth moving bed reaction zone and recovering a normally liquid, catalytically-reformed product from the resulting fourth moving bed reaction zone effluent.

7. The process of claim 6 further characterized in that said first moving bed reaction zone contains the least amount of catalyst particles.

8. The process of claim 6 further characterized in that said first moving bed reaction zone contains from 5.0 to about 15.0%, by volume, of the total catalyst particles, said second moving bed reaction zone from about 15.0 to about 25.0%, said third moving bed reaction zone from about 25.0 to about 35.0% and said fourth moving bed reaction zone from about 35.0 to about 50.0%.

* * * * *